(12) United States Patent
Hadell

(10) Patent No.: US 7,286,683 B2
(45) Date of Patent: Oct. 23, 2007

(54) CONTAINER IDENTIFICATION AND TRACKING SYSTEM

(75) Inventor: Per Anders Hadell, Västerås (SE)

(73) Assignee: ABB AB, Västerås (SE)

( * ) Notice: Subject to any disclaimer, the term of this patent is extended or adjusted under 35 U.S.C. 154(b) by 734 days.

(21) Appl. No.: 10/417,233

(22) Filed: Apr. 17, 2003

(65) Prior Publication Data

US 2004/0126015 A1 Jul. 1, 2004

(51) Int. Cl.
G06K 9/03 (2006.01)
G06K 9/18 (2006.01)

(52) U.S. Cl. .................. 382/100; 382/103; 382/182

(58) Field of Classification Search ........... 382/100, 382/103, 182, 309–311; 707/215, 221, 225; 701/204, 207, 223
See application file for complete search history.

(56) References Cited

U.S. PATENT DOCUMENTS

| | | | | |
|---|---|---|---|---|
| 3,762,754 | A * | 10/1973 | Goyarts .................. | 294/81.54 |
| 5,142,658 | A * | 8/1992 | McMorran et al. ......... | 382/104 |
| 5,455,875 | A * | 10/1995 | Chevion et al. ........... | 382/311 |
| 6,028,970 | A * | 2/2000 | DiPiazza et al. ........... | 382/309 |
| 6,161,887 | A * | 12/2000 | Shiota et al. ............. | 294/81.2 |
| 6,587,586 | B1 * | 7/2003 | Cui et al. .................. | 382/176 |
| 6,768,931 | B2 * | 7/2004 | Takehara et al. ........... | 700/225 |
| 6,819,778 | B2 * | 11/2004 | Kamei ...................... | 382/103 |
| 2003/0156199 | A1 * | 8/2003 | Shindo et al. ......... | 348/207.99 |
| 2004/0103101 | A1 * | 5/2004 | Stubler et al. ............. | 707/100 |

FOREIGN PATENT DOCUMENTS

| | | |
|---|---|---|
| EP | 0822158 | 2/1998 |
| EP | 0862132 | 9/1998 |
| EP | 0887120 | 12/1998 |
| EP | 1043262 | 10/2000 |
| JP | 10181885 | 7/1998 |
| JP | 11325841 A * | 11/1999 |
| WO | 96/07929 | 3/1996 |

* cited by examiner

Primary Examiner—Matthew C. Bella
Assistant Examiner—Yubin Hung
(74) Attorney, Agent, or Firm—Venable LLP; Eric J. Franklin

(57) ABSTRACT

A system for automatically identifying containers that are loaded/unloaded by a crane and for capturing and/or analyzing images of at least a part of the container. A camera control system is arranged to receive information generated in, and/or transmitted from, a crane control system thereby controlling at least one of the functions of one or more cameras in order to capture one or more images of at least a part of the container. A method for identifying and tracking a container handled by a crane in a container terminal includes locating/mounting one or more cameras on a crane structure; activating the correct camera or cameras when a container is near or approaching the camera level; capturing one or more images of at least a part of the container; analyzing the captured images to identify the container ID; and recording/storing the ID and information regarding the container.

22 Claims, 10 Drawing Sheets

CONTAINER IDENTIFICATION AND TRACKING SYSTEM

FIELD OF THE INVENTION

The present invention relates to a system for automatically identification of cargo containers in a loading or unloading situation, preferable at port areas and especially for capturing and/or analyzing images of at least a part of a cargo container.

BACKGROUND OF THE INVENTION

There is an increasing commercial importance and need for systems that are capable of automatically reading and identifying of cargo containers and for keeping track of the individual containers in a container terminal or after having been loaded/unloaded to/from a ship, train or the like.

In modern terminals, the flow of containers is normally registered at the gate. All cargo or freight containers are each provided with a unique identification marking or code, ID, that must be checked and verified. The container ID is recorded by the terminal logistics in order to create a later shipping instruction for sending the container out on a ship, train or the like by using a handling apparatus such as a crane. In order to minimize mistakes and "loosing" containers, all containers also have to be assigned when and to where the container is loaded/unloaded.

For containers being loaded/unloaded to or from a ship or a train, such ID are read and handled manually by an operator and entered manually into a computer system for controlling operations in the cargo container terminal.

There are several problems with this. Both true position of storage in the ship or on the train, the sequence and the collection from trucks is frequently erroneous compared to the logistic instruction. Manual systems are also clearly inefficient as it is time consuming and errors more easily occur i.e. when data manually is entered into computer systems. If a container is lost or subject to wrong routing or just misplaced lead to unnecessary time delays for finding it, which creates unwanted and unnecessary costs.

Every container that is loaded or unloaded from a truck, between the legs or in the backreach of a quay crane, must pass the sill beam height level of the crane. The time when this is done, the size of the container passing and the exact position where the driver may pass this level is unknown. All kinds of odd moves or shuffle relocations made by the driver on ship or over quayside that do not result in a "complete job", that is transferring a container on or off the ship, may happen and the same container may pass the sill beam height level several times. It is a problem to identify or detect incomplete job moves, i.e. if a container is moved but did not result in a "job complete", i.e. the container were not completely loaded or unloaded.

Truck travel direction and final position while being loaded or unloaded is also unpredictable. Other trucks may as well be passing the truck being served by the crane and may then be blocking the side view of the container.

The container ID should always be checked when the crane finished the job and the time should be logged and related to the crane or ship/train position, linked to the container ID and returned to the terminal logistics via a printer, a data log, a network, a radio link or a display.

MOST IMPORTANT PROBLEMS TO BE SOLVED

When automating the process of identifying and keeping track of each cargo container in a loading or unloading situation there are some problems to solve.

For example all containers passing the crane when loading or unloading onto or from a ship, train or the like are not always correctly identified. It is then a problem to adequately combine each containers position after having been loaded or unloaded with its ID number and loading time, i.e. after "job complete". Another problem may be that a verifying image of the container ID and also of the whole container as such is not saved for later control.

A camera for checking the container ID must have correct view angle or zoom into a certain area of the container in order to capture images that can be analyzed by an OCR system. The container passes the camera level at different distances, between i.e. 3-26 meters, from the location of the cameras which means that the cameras, quick and accurate, has to zoom in the ID area of the container or in special cases the whole container. The capturing of the images has normally also to be done on moving containers, as there is no time for stops or delays in the job cycle.

PRIOR ART

Container handling systems that automate the information about the containers are earlier known.

Such a system is described i.e. by JP 10181885, which automate the transmission of the cargo work information of a container transporter from the entrance of a container terminal to the exit of the same. A data carrier holds information of the container such as its specification and identification number, the store position of it etc. The method is unspecific but includes in general a reading device arranged on a transfer crane and which reading device transmits the data to a display that can be read by the driver of the crane so the driver is informed where the container should be loaded/located. The purpose of our invention is not to transmit data to the driver of the crane but to capture an image of and analyze the container ID and link this to the information generated by the crane control system.

EP 0887120 describes a system for identifying containers handled by a container handling apparatus. Each container has an identifying pattern and a camera generates an image that is analyzed. However this system is aimed at inspection of molded containers such as glass bottles or jars in order to find defective products. The purpose and the design of this system are therefore completely different from the present invention.

EP 0862132 describes a system for recognizing an identification code such as a licensing plate and particular adapted for situations where visual disorders can occur such as that the plate may be partially covered by the frame that holds the plate or simply at least partly covered by dirt from the roads. The purpose of this invention is to improve the reliability of the analysis of the identification pattern. Our invention is focused on the image capturing process, how this is performed and our invention is also used in a different situation.

THE OBJECT OF THE PRESENT INVENTION

The object of the invention is to provide a system and a method for identification of a container, by automatically capturing and/or analyzing images of at least a part of the container that is handled by a crane, preferable at port areas, comprising at least one camera, a camera control system and a crane control system.

A system for automatically capturing and/or analyzing images of at least a part of a container that is handled by a crane, is provided by that the camera control system is arranged to receive information generated in, and/or transmitted from, the crane control system thereby controlling at least one of the functions of the camera or cameras in order to capture one or more images of at least a part of the container.

A method for identifying and tracking a container handled by a crane in a container terminal includes the step of
- selecting the correct camera or cameras when a container is near or approaching the camera level,
- setting the correct image size of the camera by changing the zoom value
- capturing one or more images of the container and/or its ID marking area,
- analyzing the captured images to identify the container ID number
- recording/storing the ID number of the detected container.

Other objects, features, and advantages of the invention will become evident in light of the following detailed description considered in conjunction with the enclosed drawings and defined by any of the dependent claims.

BRIEF DESCRIPTION OF DRAWINGS

For better understanding of the present invention, reference will be made to the accompanying drawings in which.

DESCRIPTION OF THE PREFERRED EMBODIMENTS OF THE INVENTION

Figure 1:
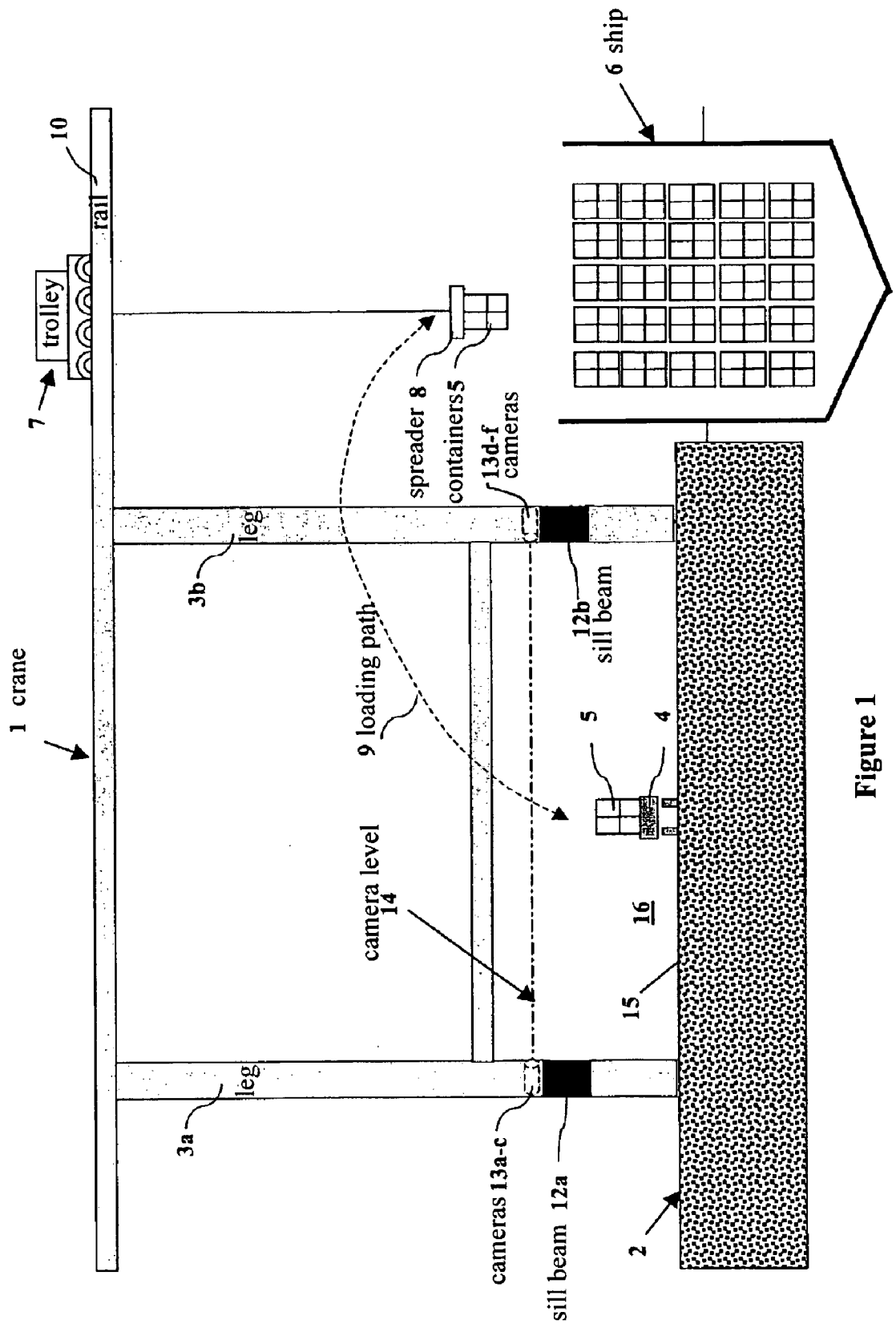
FIG. 1 is an overview of a system according to the invention showing a rail-mounted crane loading containers from a truck, located between the legs of the crane, to a container ship.

FIG. 1 shows a rail-mounted container crane 1 located on a quay 2. On the quay 2, and between the legs 3a,b of the crane 1, i.e. the loading area 16 of the crane 1, a truck 4 with a container 5 is indicated and along the quay 2 a ship 6 for containers 5 is berthed. The crane 1 is, by help of a trolley 7 and a spreader 8, loading a container 5 from the truck 4 onto the ship 6 and the loading path 9 of the spreader 8 and container 5 is indicated with a curved arrow. The trolley 7 of the crane 1 is able to move in two directions on a rail 10 along a trolley centerline 11 (see FIG. 6).

The crane 1 has two sill beams 12a,b on which at least one, preferably three, cameras 13a-f are arranged on each sill beam 12. The cameras 13 can be any type of video cameras or digital cameras or similar and are arranged in such a way that their lens axis or optical center are essentially horizontal and/or parallel to a camera level 14 and/or the center line of the spreader 8. Of course it may be possible to locate the cameras 13 in a different angle for special purposes. The cameras 13 are arranged on the crane 1 at a distance from each other, corresponding to the difference in locations where the container 5 marking areas 18 of different container 5 sizes may appear.

The camera level 14 is located on a certain distance above the upper surface 15 of the quay 2, preferably about 6 meters above the surface/ground. Where the ID marking area 18 of a container 5, during loading/unloading, passes this camera level 14 is defined as the cross point. The cameras 13 are controlled by a camera control system CCR. The cameras 13 located on both sill beams 12 are directed inwards, i.e. into the center of the loading area 16 of the crane 1, in order to make it possible for the cameras 13 to face both sides of containers 5 being handled by the crane 1.

The camera control system CCR is arranged to determine the relevant zoom position of each activated camera 13 out of information of the spreader (8) position transmitted from the crane control system CCS when an anti-sway control is used as part of the CCS Crane Automation 25.

Figure 2:
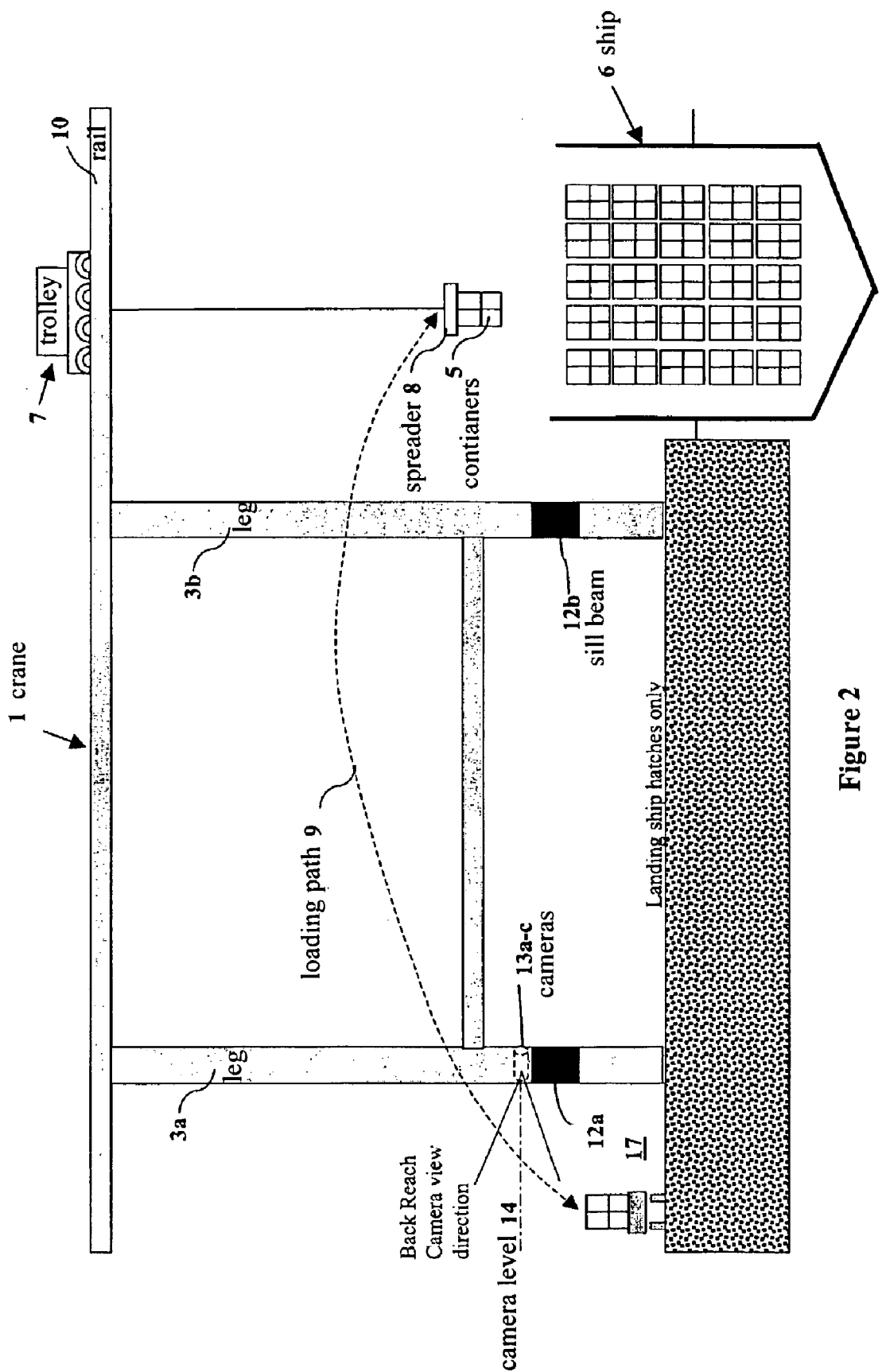
FIG. 2 is a similar view as FIG. 1 but where a truck is located behind the crane, in the backreach area of the crane.
Figure 3:
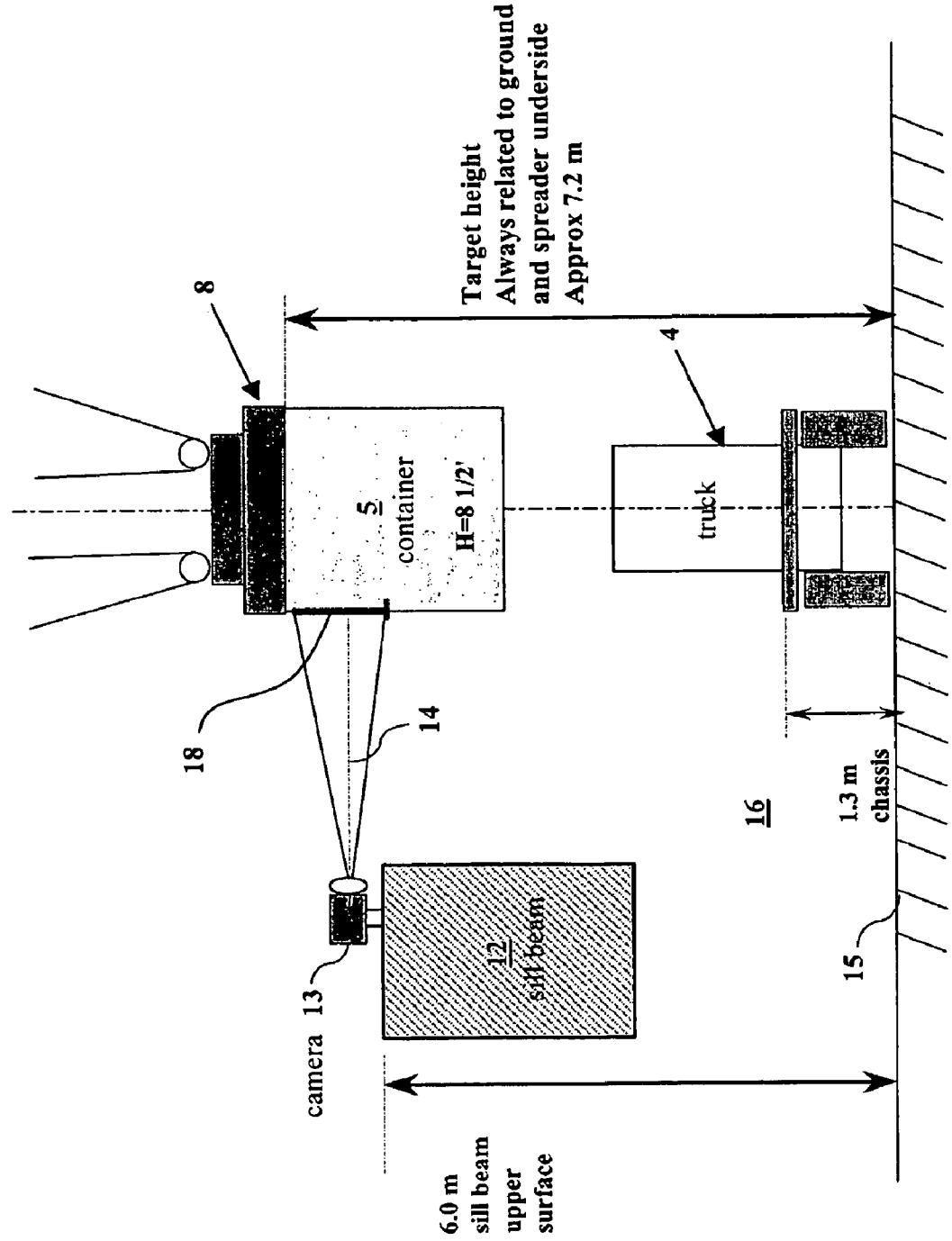
FIG. 3 shows more in detail a side view of a container lifted by a spreader from a truck up to the camera level.

In some ports (see FIG. 2) the containers 5 are loaded or unloaded from the backreach area 17 of the crane 1, behind (to the left of) the rear sill beam 12a. In this case only ship hatches are landed between the rails (not shown) and the legs 3 of the crane 1. The cameras 13 are in this case located on the landside sill beam 12a and directed towards the backreach area 17. Only one-sided image recording is possible in this case. Otherwise the procedure is unchanged.

Containers 5 that are handled by cranes 1 in a container terminal can be of different sizes. The length of the containers 5 can typically be 20' or 40' and the spreader 8 is adjusted by the driver and/or the crane drive system to the different sizes in order to be able to connect to and lift the containers 5. The spreader 8 also can be adjusted to lift two 20' containers at the same time.

Figure 4:
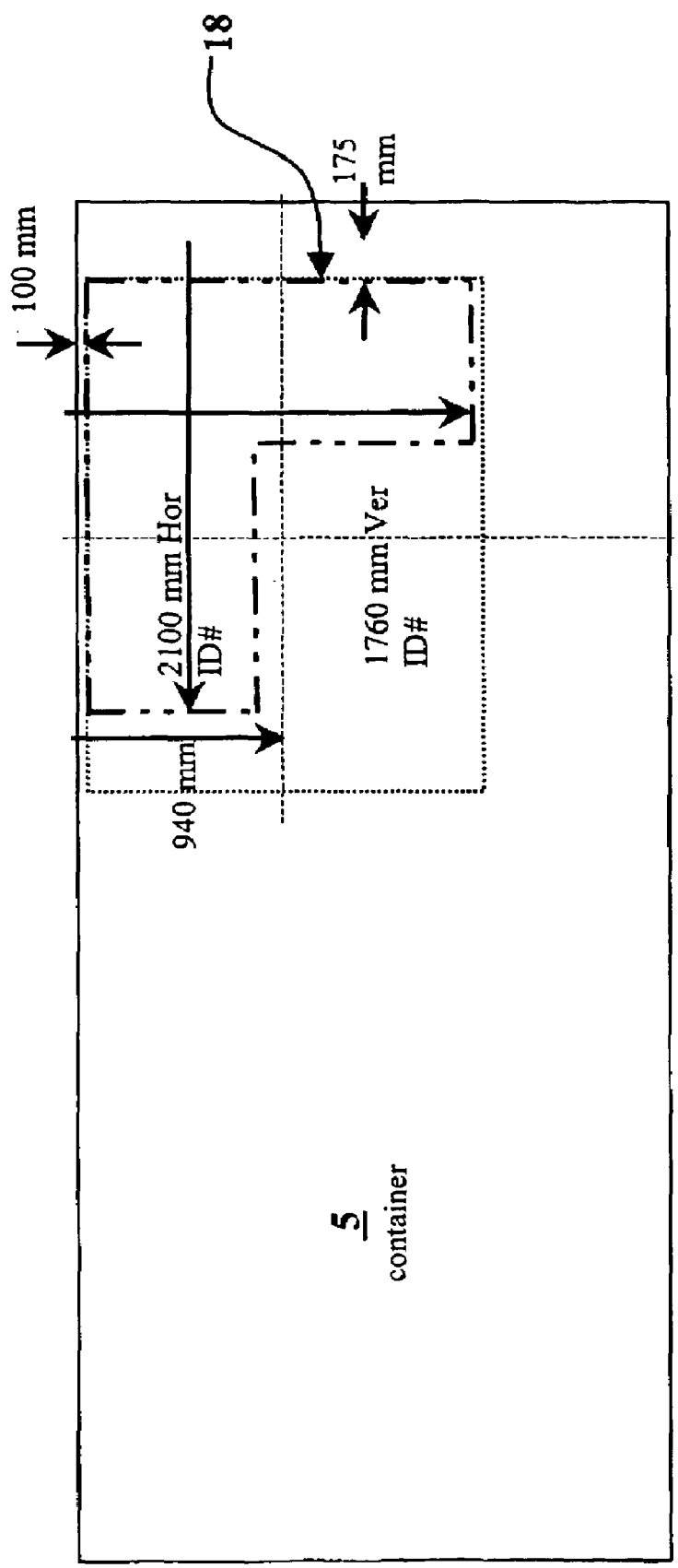
FIG. 4 shows a side view of a container identification marking area, where it is located on the container and the camera image area required for ID identification.
Figure 5:
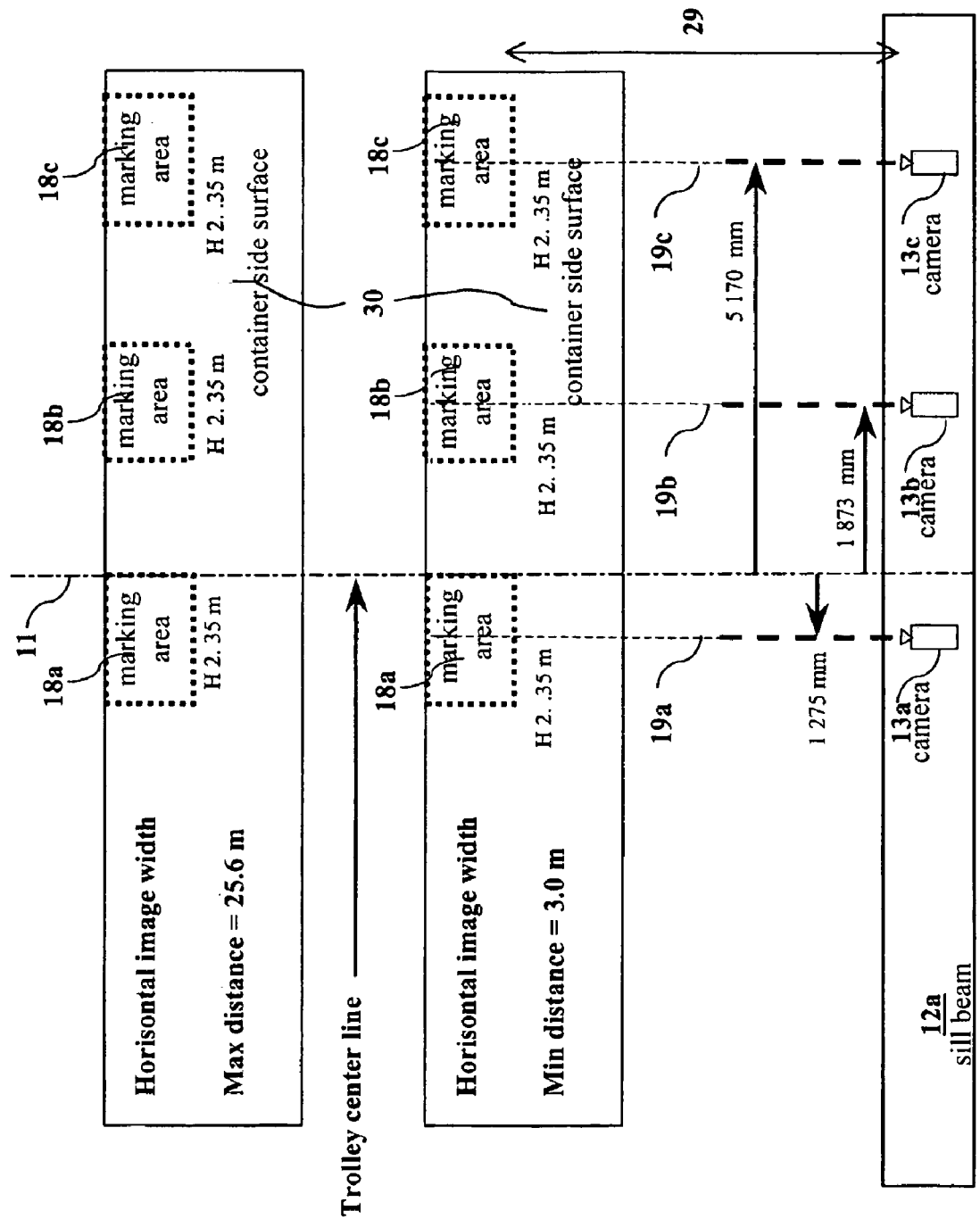
FIG. 5 illustrates schematically a side view of the different positions possible where a container identification ID marking area may appear in the loading area of a crane.

Each container 5 has a marking area 18 (FIG. 4) comprising a unique ID, i.e. a number or similar, not shown. The marking area 18 is located at a certain position of both long sides of the container 5 according to ISO 6346. The marking area 18 is located in the upper right corner of the container 5 and the center of the marking area 18 is approximately 95 cm from the top and 132 cm from the right corner of the container 5. FIG. 5 shows examples of where these ID marking areas 18 a-c of the containers 5 may appear in the front of the cameras considering that there are containers 5 with different sizes. The marking area 18 is always related to the height of the spreader underside above ground, also called "hoist position". Therefore, the marking area 18 appears at the camera level 14 at the same hoist position and is not dependent on the container height which can vary from 8 up to 9_feet, typically 8_ or 9_feet.

In order to safely capture an image of the ID marking areas 18 of all possible container sizes, images are captured of each marking area 18a-c by a separate camera 13a-c.

Figure 6:
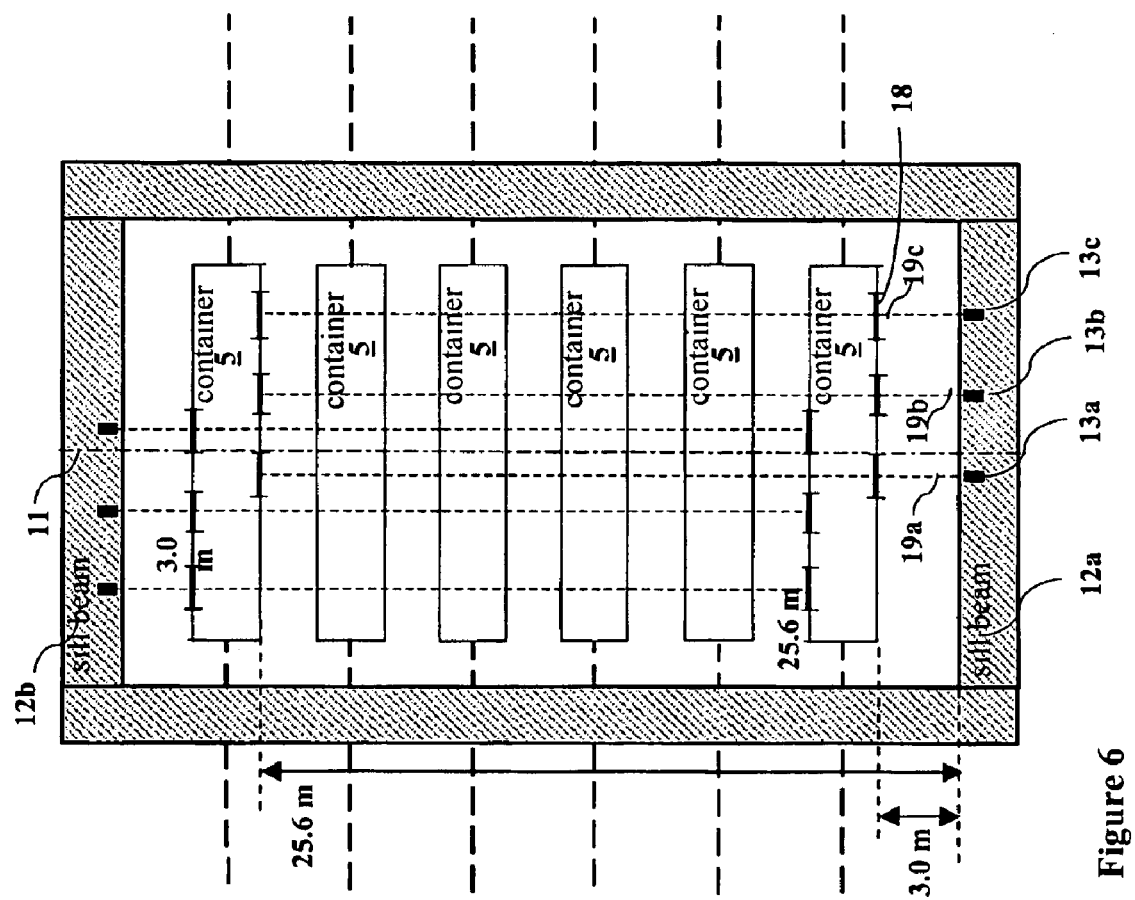
FIG. 6 shows, from above, the crane loading area, the locations of the different cameras, the different possible positions where containers to be loaded/unloaded can be located, as well as the centerline of the trolley.

With reference to FIG. 5 and 6 there is therefore provided three cameras 13a-c on each sill beam 12a,b. Each camera 13 is located in parallel lines 19a-c each coincide with one of three possible positions of a container ID marking area 18. The correct camera 13a-f, (i.e. that camera 13 that is located on the position where the container will pass) on each side, is activated depending on the position of the spreader 8 width information of which is known/generated in advance by the crane drive system and crane control system CCS. The containers 5 can appear on varying distances from the cameras 13 (and on different lines 19a-c) and the exact zoom position, i.e. the distance from the camera 13 to the container 5 side surface 30, is known and defined by the information of the trolley 7 or spreader 8 position. This information or these data are transmitted to the camera control system CCR, i.e. when the container 5 is arriving to or is approaching the camera level 14 from above or from below. The camera view must cover the marking area 18 and has typically 5 to 42 degrees horizontal view working angle.

The final capture procedure of the image of the containers ID marking area 18 is determined and activated/started by the spreader height position relative to the camera level 14. When the container ID marking 18 passes a certain level (at a certain distance from the camera level 14, about 5 to 7 meters, preferably 6 meters, above ground) and approaches the camera level 14 the correct cameras 13 are activated/started and images are captured and stored. In order to minimize the need for storing capacity a limited number of images (preferably about 10 images) are captured and stored on a disc in a CCR database unit 21. An OCR evaluation unit 20 are arranged to analyze the images captured and identify the containers 8 ID.

According to the invention the CCR and CCS units is connected to each other via a link 28 in such a way that the information (data and logistic signals) from the crane drive system can be exchanged between the two units. The CCR is arranged to activate/start the correct camera or cameras 13a-f, normally only two at a time, one on each sill beam 12a,b, depending on the position of the spreader width (e.g. 20', 2×20' or 40') which is detected or known in advance by the crane control system CCS and the spreader width thereby determines where the marking area 18 of the container 5 will appear in the loading area 16 of the crane in front the cameras 13a-c. The information of the spreader width is transferred from the crane control system CCS to the camera control system CCR.

The exact zoom position, i.e. the distance 29 from the cameras 13 to the container side surface 30, is defined by the trolley 7 position (or the spreader 8 position if an anti-sway system is used by the crane 1). These data is transmitted to the camera control system CCR with an update interval of typically 200 ms. The height and hoisting speed of the spreader 8 is also transmitted to the camera control system CCR with an update interval of 50 to 200 ms, typically 200 ms. At every update, the CCR system calculates the Expected Time of Arrival (ETA) of the container ID marking area 18 to reach the height of the camera level 14, from above or from below, by dividing the remaining hoisting distance to the camera level 14 with the prevailing hoisting speed.

When the calculated ETA value becomes close to the time needed for moving the camera zoom between its endpoints or end positions, the CCR system changes the zoom position of the selected camera 13 to a value determined by the trolley 7 (or spreader 8) position. As the value changes, the zoom of the camera 13 will follow the changes until the image capturing procedure has stopped (see below), after which the zoom function of the camera 13 will rest.

Unnecessary zooming will shorten the expected life of the camera zoom system. The above procedure reduces the active time of operation to a few seconds typically per cycle.

The time frame for capturing of images for OCR analysis is determined by the spreaders 8 vertical movements. This will enable CCR to determine when to start and when to stop the capturing of images.

Capturing of images from the selected camera 13 is started, at the latest, when the ETA value reaches between one and two times of the update interval for the hoist position. Capturing is stopped after that the container target marking area 18 has surely passed beyond (above or below depending on the direction of the movement) the camera level 14, by comparing the updated hoist position value to the value of the camera level 14. After the marking area 18 has passed the camera level 14, a limited number of images, about 5 to 20, typically 10 at a high hoist speed, have been captured, out of which one image at a time can be selected and transmitted to the OCR unit 20 for analysis, until the container ID is identified as correct with a high degree of reliability. The ID (i.e. a number) is then sent to the Control & Interface unit 26 and stored on the CCR Database 21. The ID may also be sent back to the CCS unit and also to the Terminal Landside System.

If the hoist speed is very low while the target marking area 18 is passing the camera level 14, the number of images may go beyond 20 before CCR stops the capturing, in order to ensure that the ID is captured correctly and completely.

The OCR evaluation unit 20 has a capacity of finding the ID number of an image in about 50 to 500 ms, typically 100 ms. By using an OCR evaluation unit 20 that is faster than the camera capturing speed, i.e. maximum 25 images/second, it is possible to eliminate the saving of images and send the image information to the OCR unit 20 immediately after being captured. In this way, the stopping of zoom and image capture is determined by the correct and reliable ID number being identified/analyzed.

The capturing of images is made while the container has been hoisted from a truck or the ground, and while the target marking area 18 is passing the camera level 14. The height of the spreader 8 underside relative to ground is then between 6 to 8 meters, preferably around 7.2 meters. Preferably, this will occur before the trolley 7 starts moving. Limited trolley 7 movements can be tolerated during image capturing, since the zoom position is quickly moved (a short distance) to compensate for a short spreader 8 distance change. The hoist velocity is in this moment typically 0.5 meter per second, but higher speeds can be tolerated by matching the camera 13 exposure time to the higher speed.

Figure 7:
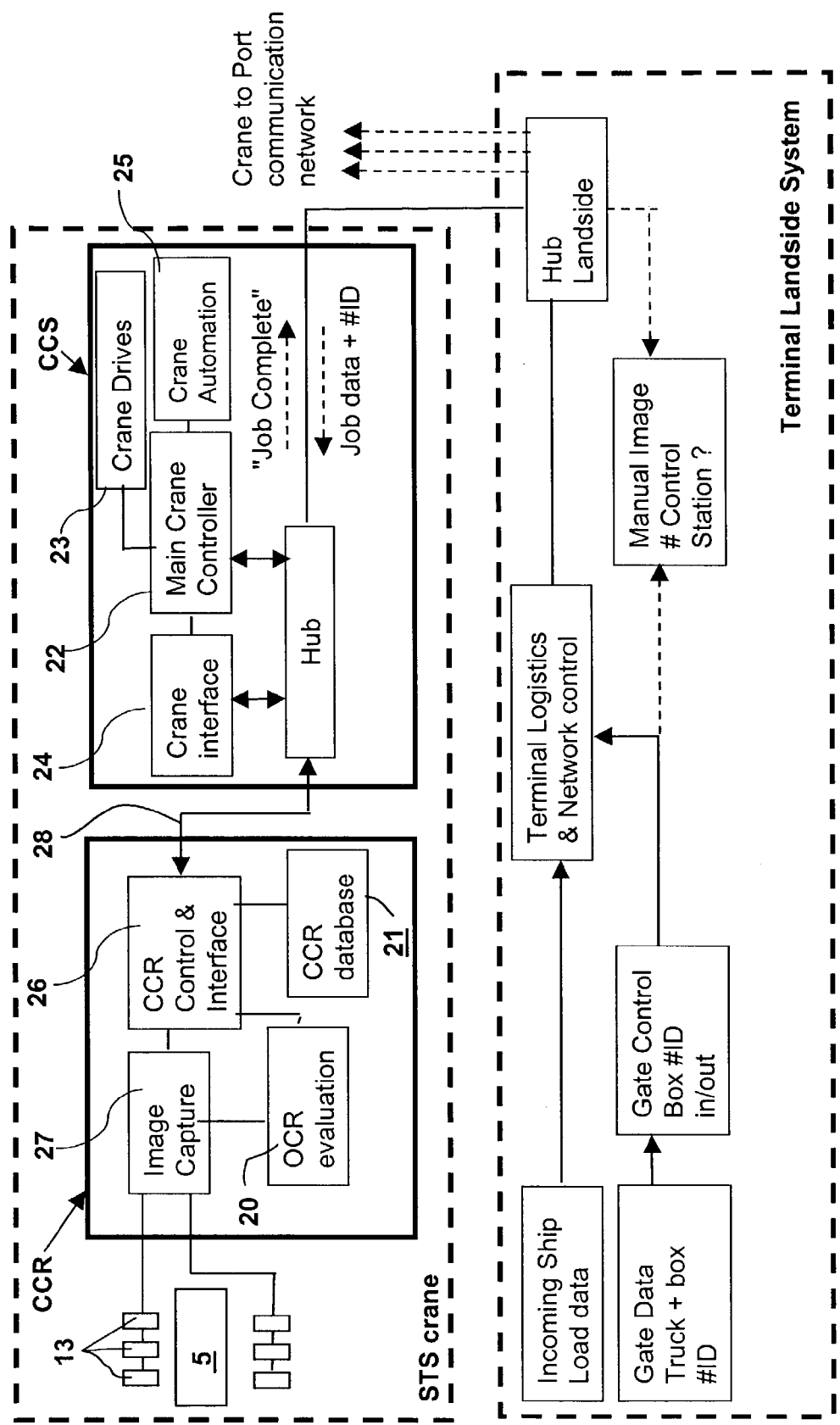
FIG. 7 shows a block diagram of a single crane system.

The block diagram of FIG. 7 shows the crane 1 with related equipment and the landside, and how the communication between the units is arranged.

A landside computer can work as a control station where images are manually controlled to determine cases where readability is low. Such a control station can also work as a long time storage of images from one or more cranes 1, where they can be recovered later for verification. The crane side equipment seen is CCR and CCS and how they are communicating with each other. CCS has a Crane Interface link 24 to the Main Crane Controller 22, which can be linked to any existing Crane Automation unit 25, such as Ship data and cell positions on the ship 6. Speed and position data is sent from the Crane Drives 23 to the Main Crane Controller 22.

In the CCR, the Control & Interface 26 influences the Image Capture unit 27 of camera signals by using video grabber electronics. When the container 5 has passed the image capture camera level 14, CCR will command the video grabber memory to send images to OCR evaluation unit 20 for analysis. The OCR evaluation unit 20 will respond to CCR after analysis of each image is completed. The cycle will continue until OCR evaluation unit 20 reports the container ID of the image with the highest reliability.

The combination of using video cameras 13 having analogue signal output with high image frequency, typically 25 per second, and a video grabber electronics (Image Capture) in the computer containing the CCR software, it is possible to ensure that the best image is captures during the limited time of marking area 18 passing in front of the camera. To use single image cameras is also possible, but the task of correctly timing the best single shot becomes more sensitive. The images containing the best/correct ID number and the full size container image are stored, together with the ID number itself and time, in a local CCR database unit 21.

Figure 8:
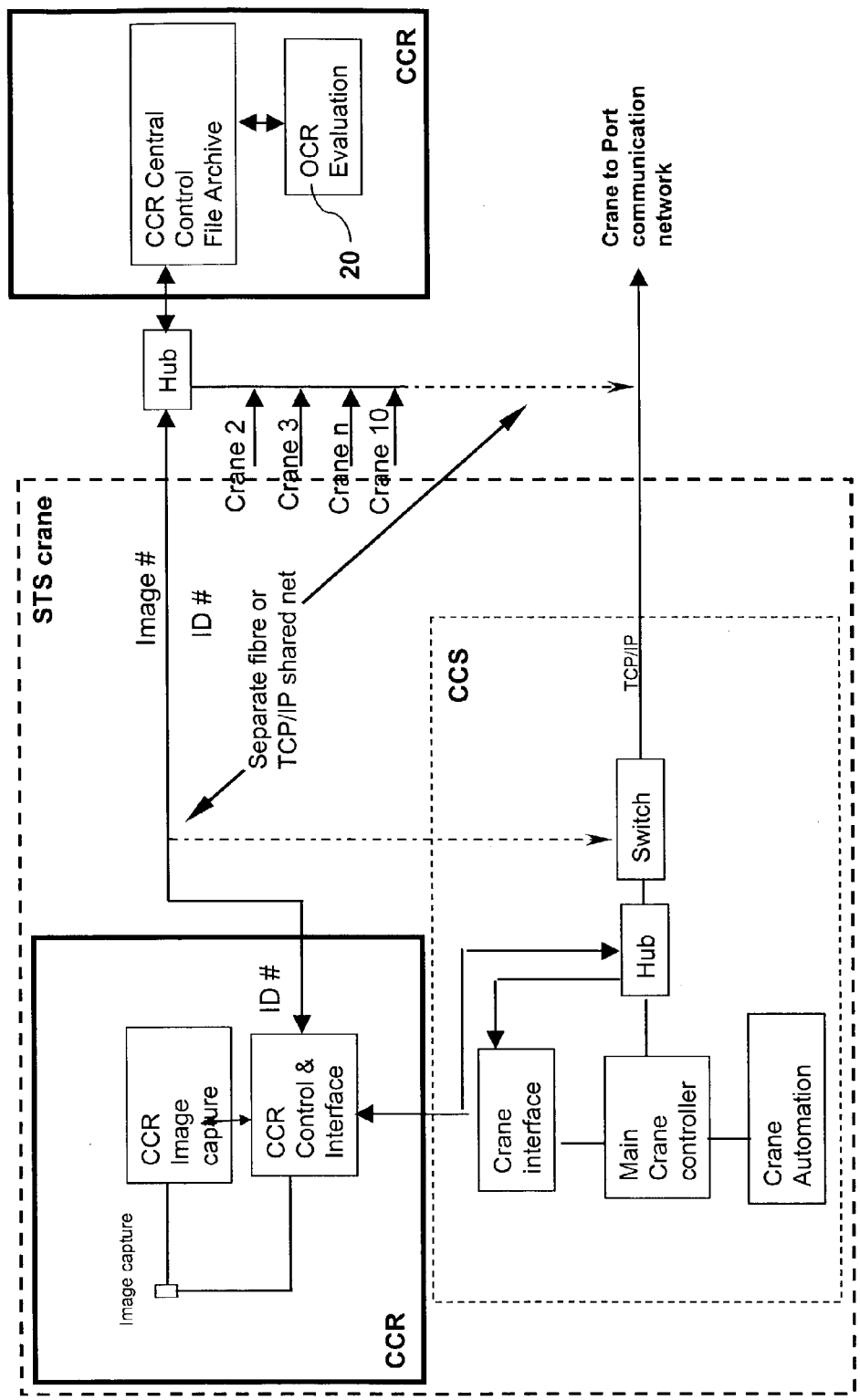
FIG. 8 shows a block diagram of a multiple crane system with a central OCR unit for more than one crane.
Figure 9:
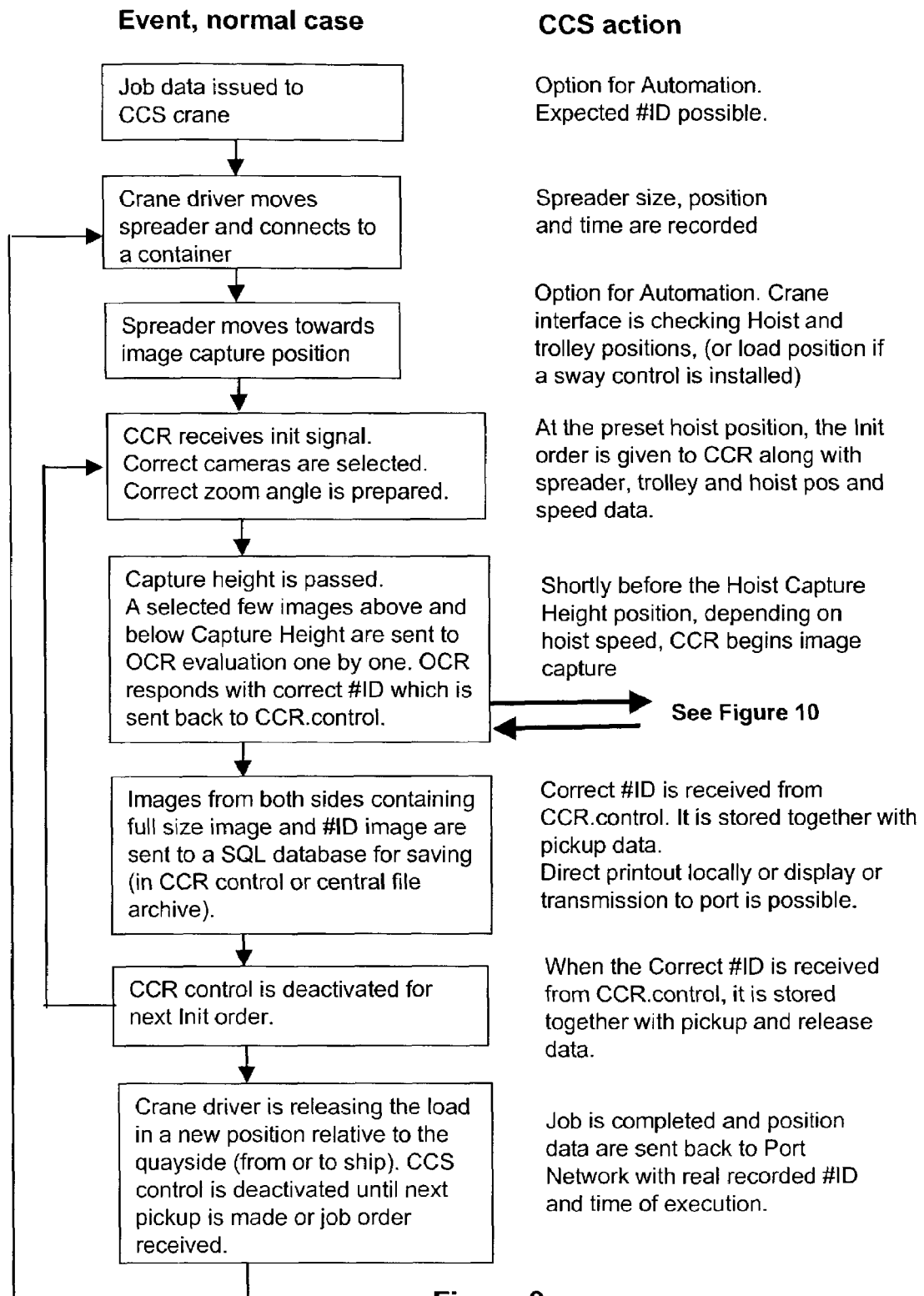
FIG. 9 shows a flowchart over a normal case of the system work cycle.
Figure 10:
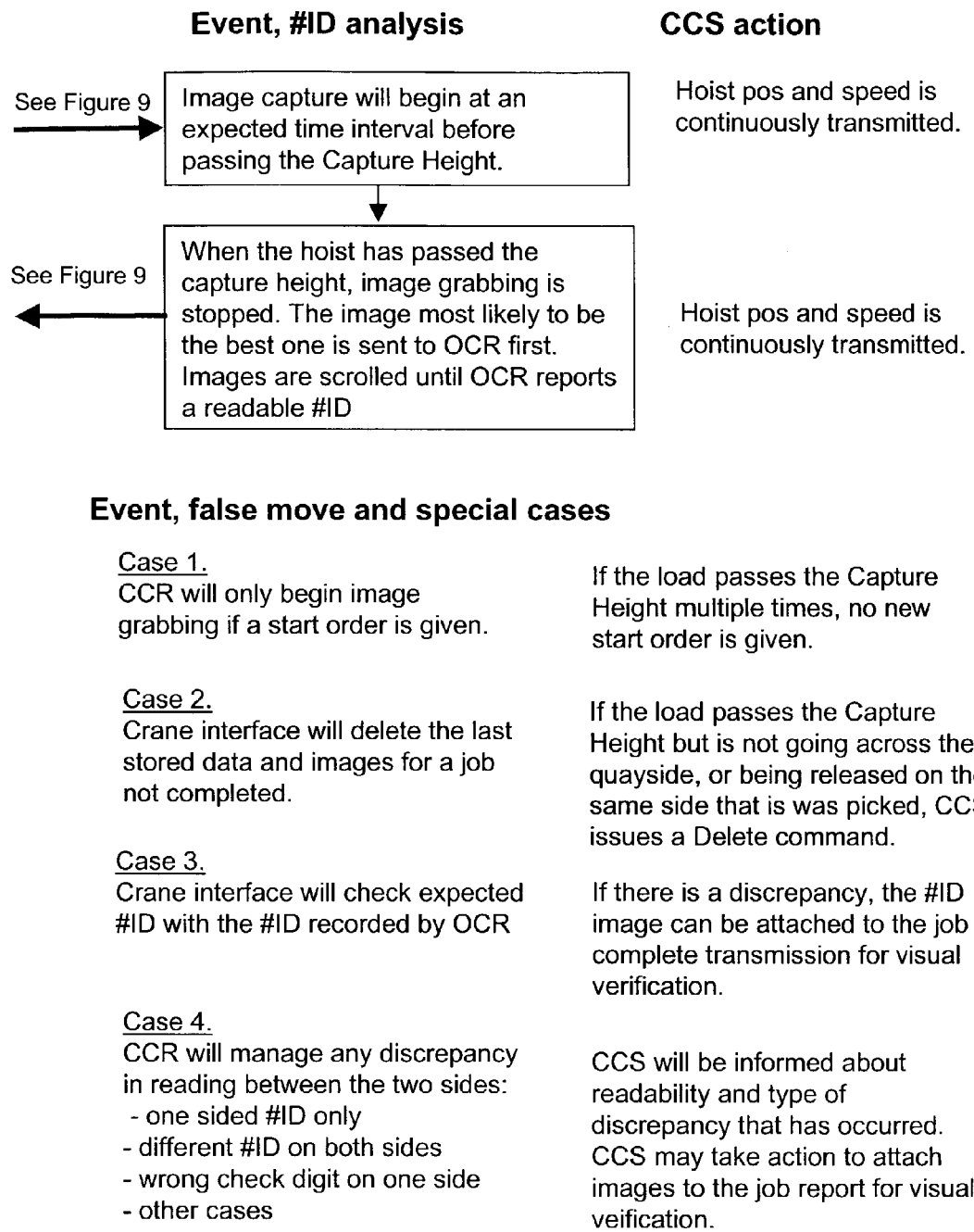
FIG. 10 shows a flowchart over the ID marking analysis and examples of false move cases and special cases of handling OCR response to a selected image.

The system described by FIG. 7 can be modified for a terminal where several cranes 1 are equipped with the present invention. This is described in FIG. 8.

By using a landside communication line, i.e. a fiber optics line, connected to a central OCR evaluation unit 20, the image analysis of multiple cranes can be managed. Since the OCR analysis works relatively fast, and the images of the container ID are relatively few, this is a more cost effective alternative. Image capturing and storage is then centralized to one computer carrying the OCR software. In this way up to 10 cranes 1 can be managed by the same OCR evaluation unit 20. A faster OCR or more than one centralized OCR can be arranged to manage a very large terminal.

The success of finding the ID with all characters clearly and sharply present depends on the correct container target marking area 18 height when the image capturing starts and stops. Due to hoist wire rope stretching/elongation over time, and especially for new installed wire ropes, the ideal container 5 height position for starting and stopping the capturing of images for analysis will slowly change. The CCR is arranged to automatically create a wire rope stretching/elongation compensation by applying a correction value. The CCR will find out which one of the images, counted from the beginning of the capturing procedure, that results in the best (most correct and good) analyse of the container ID. When the image number becomes too large, a correction value is applied that recalibrates the container height value that initiates the starting and stopping of the recording of images. Thus, an automatic wire rope stretching/elongation compensating mechanism is created.

In addition, the correct image capture is affected by any, of mechanical or electrical origin, deviation between the camera level 14 and the true slope of the optical lens axis of the cameras 13, after being permanently installed. If such deviation appears, it can be entered by initial calibration during first startup as a linear capture height correction factor relative to the trolley 7 position (or actual distance from the camera lens to the target marking area 18). In this way, CCR will compensate automatically the height of start and stop of image capturing. This correction factor is entered for each individual camera 13 in the system. The camera control system (CCR) is accordingly arranged to automatically create a correction, if a camera (13) lens axis is not essentially parallel to the camera level (14), and that recalibrates the container height value that initiates the starting and stopping of the capturing of images.

Alternatively to using the hanging load position (the trolley 7 position) for the exact setting of the zoom value for the selected camera 13, each camera 13 can be equipped with an autofocus setting mechanism using i.e. a laser beam, ultra sound or other known method of distance measurement to define the correct zoom value prior to capturing of images.

In order to improve the quality of the images captured, and to improve the OCR analysis performance, one or more lamps are arranged in such a way that the container ID marking area 18 is illuminated. The camera control system CCR is arranged with a communication link, cables or a radio link, to each camera 13 and data including the position of each cameras diaphragm and exposure time used is transferred to the camera control system CCR. A request for the illumination to be switched on, or off, is generated when the preset limits are reached.

One image from each side of the container is stored for manual/visual verification of the container marking area 18. These images can be attached to the immediate job report transmission or later recalled for visual viewing. In particular, when one side ID is identified and recorded as different from the other side ID, a manual/visual determination of a container ID that may be partly unreadable due to environmentally distortion, partially covered by dirt, corroded, variations in character types, the background of the numbers, light conditions etc, will increase the overall reliability of the container tracking and "job complete" report. This possibility facilitates a robust and reliable tracking system.

One of the cameras 13*a-f* that is not, for the moment, used for ID analyzing and recording can be zoomed out to an angle of view that will capture the entire container 5 side to side. Two more images are in this way stored or sent to the interface for transmission to the port central unit. A manual/visual verification of the container 5 status is thereby created for later use in case of damage control.

After being lifted, the container 5 is moved to a different point opposite to the quayside position. When it is released from the spreader 8, the automation has logged the position of pick-up, the position of release, the time of release and it has received the real container ID. Only at this point, the information is regarded as "job complete" for transmission to the output media, normally a network to port logistics. A printer, a display, a radio communication can alternatively be used as output. As required, this information can be coordinated with a job instruction from the port logistics to determine whether there is a difference in the job performed to the instruction, including the handling of a container with an unexpected ID. Depending on the degree of crane control automation, the "job complete" report will contain position data related to the crane or the ship (as Bay, Cell and Height parameters/values). Generally, the system works independent of the mode of crane operation (auto-pos or manual).

For its function the camera control system CCR uses the following signal values/parameters transferred from the crane control system CCS:

init signal (start cycle) job-id,
    spreader size,
    trolley position and speed,
    hoist position and speed,
    abort signal (stop cycle),
    delete (job-id),
    on/off of CCR system and
    commands to database with images stored (SQL or other).

The camera control system CCR transmits the following signal values/parameters to the crane control system CCS:

container ID number,
    capture reliability level (in %),
    error code,
    measurement error code,
    equipment status and warning messages, time stamp and On/Off signal for crane lighting support.

At least part of these signal values/parameters, as well as time, are used to carry out the system and method according to the invention.

Depending on the local conditions (crane structure, lamp location, terminal illumination or weather extremes) of a crane in a terminal, special additional lamps can be mounted to illuminate the ID marking area of containers during the image capturing process.

The present invention has a number of possibilities and advantages. The target container 5 can be moving during the image capturing procedure, which means that there is a small or no delay at all in the container handling cycle. Several trucks 4 can be located within the loading area 16 or passing the loading area 16 without blocking the image capturing, analyzing or recording. The trucks 4 can be freely positioned for loading/unloading as the camera zoom-position is updated online.

Each ID number of both sides of the container 5 is detected and manual/visual image verification is possible if the two IDs are deviating from each other. Stationary cameras 13*a-f* is mounted on the sill beams 12*a,b* via stable fixing foundations giving a system that is reliable and easy to access for service. The system can handle all types of standardized containers 5 such as 20', 2×20', 40', 42' or 45'. Other sizes can also be used and if necessary more cameras 13 can be included in the system or the cameras 13 can be relocated.

A method according to the invention may also include the steps of recording/storing the time and position of disconnecting the detected container from the spreader and detecting the completion of load/unload cycle to/from a ship, linking this information to other data above, and transmitting it to the terminal logistics.

Information/data generated by the camera control system (CCR), is transmitted to the crane control system (CCS), which is arranged to use that information as part of a container tracking and job order handling. The camera control system (CCR) is also arranged to transmit the information of the container ID and a value of the reliability of the ID analysis as well as a measurement error code, defined by a series of different errors, to the crane control system (CCS).

At least one camera (13) is also arranged to capture images of the entire container (5) in order to determine the presence of possible external container damages.

It is of course also possible to use the concept according to the invention for different portal beam heights. The "job complete" can also be linked to ID image presentation or compared to expected result.

It is noted that while the above describes exemplifying embodiments of the invention, there are several variations and modifications which may be made to the disclosed solution without departing from the scope of the present invention as defined in the appended claims.

I claim:

1. A method for identifying and tracking a container handled by a crane in a container terminal, comprising:
    selecting a correct camera or cameras when a detected container is near or approaching a level of the camera or cameras,
    setting a correct image size of the camera by changing a zoom value,
    capturing one or more images of the container and/or an ID marking area of the detected container,
    analyzing captured images to identify an ID number of the detected container,
    recording/storing the ID number of the detected container and
    recording/storing a time and position of disconnecting the detected container from a spreader.

2. A system for automatically capturing and/or analyzing images of at least a part of a container that is handled by a crane, the system comprising:
    at least one camera,
    a camera control system, and
    a crane control system, wherein the camera control system is arranged to receive information generated in and/or transmitted from the crane control system thereby controlling at least one function of the at least one camera in order to capture one or more images of at least a part of the container, and wherein the camera control system is arranged to start and/or stop an image capturing procedure based upon information of a spreader vertical speed and a spreader height position transmitted from the crane control system.

3. The system for capturing and/or analyzing images according to claim 2, wherein at least one camera is arranged on the crane.

4. The system for capturing and/or analyzing images according to claim 2, wherein the camera is arranged at a distance of 5 to 7 meters from ground.

5. The system for capturing and/or analyzing images according to claim 4, wherein the camera is arranged at a distance of about 6 meters above ground.

6. The system for capturing and/or analyzing images according to claim 2, wherein at least two cameras are arranged on the crane in order to capture images of both sides of the container.

7. The system for capturing and/or analyzing images according to claim 2, wherein at least three cameras are arranged on the crane in order to capture images of a marking area of a container and for covering all positions where a container marking area may occur.

8. The system for capturing and/or analyzing images according to claim 2, wherein the camera control system is arranged to activate at least one camera out of information transmitted from the crane control system.

9. The system for capturing and/or analyzing images according to claim 2, wherein the camera control system is arranged to select what camera or cameras should be activated for image capturing out of information of the spreader size transmitted from the crane control system.

10. The system for capturing and/or analyzing images according to claim 2, wherein the camera control system is arranged to determine a relevant zoom position of each activated camera out of information of a trolley position transmitted from the crane control system.

11. The system for capturing and/or analyzing images according to claim 10, wherein the relevant zoom position of the camera is defined by that the image captured is essentially covering a target container marking area.

12. The system for capturing and/or analyzing images according to claim 2, wherein the at least one camera is arranged in such that a lens axis is essentially parallel to a camera level and a centerline of the spreader.

13. The system for capturing and/or analyzing images according to claim 12, wherein the camera control system is arranged to automatically create a wire rope stretching/elongation compensation by applying a correction value that recalibrates a container height value that initiates a starting and/or stopping of the capturing of images.

14. The system for capturing and/or analyzing images according to claim 12, wherein the camera control system is arranged to automatically create a correction if a camera lens axis is not essentially parallel to the camera level, and to recalibrates a container height value that initiates a starting and stopping of the capturing of images.

15. The system for capturing and/or analyzing images according to claim 2, wherein the system includes at least two cameras arranged on the crane at a distance from each other, the distance between the at least two camerasa corresponding to a difference in locations where container marking areas of different container sizes may appear.

16. The system for capturing and/or analyzing images according to claim 2, wherein information/data generated by the camera control system, is transmitted to the crane control system, which is arranged to use that information as part of a container tracking and job order handling.

17. The system for capturing and/or analyzing images according to claim 16, wherein the camera control system is arranged to transmit the information of an ID of the container to the crane control system.

18. The system for capturing and/or analyzing images according to claim 17 wherein the camera control system is arranged to transmit a value of a reliability of an analysis of the container ID to the crane control system.

19. The system for capturing and/or analyzing images according to claim 16, wherein the camera control system is arranged to transmit a measurement error code, defined by a series of different errors, to the crane control system.

20. The system for capturing and/or analyzing images according to claim 2, wherein at least one camera is arranged to capture images of an entire container in order to determine the presence of possible external container damages.

21. The system for capturing and/or analyzing images according to claim 2, wherein the camera control system is arranged to determine a relevant zoom position of each activated camera out of information of the spreader position transmitted from the crane control system when an anti-sway control is utilized.

22. A system for capturing and/or analyzing images of at least a part of a container that is handled by a crane, the system comprising:

at least one camera, a camera control system, and a crane control system, wherein the camera control system is arranged to receive information generated in and/or transmitted from the crane control system thereby controlling at least one function of the at least one camera in order to capture one or more images of at least a part of the container, and wherein the camera control system is arranged to calculate an estimated time of arrival out of information of a spreader vertical speed and a spreader height position transmitted from the crane control system.

* * * * *